United States Patent
Fujii et al.

(10) Patent No.: US 6,786,409 B2
(45) Date of Patent: Sep. 7, 2004

(54) CONNECTING STRUCTURE OF CARD, CARD, AND COMPUTER SYSTEM

(75) Inventors: Kazuo Fujii, Kanagawa-ken (JP); Masaki Oie, Kanagawa-ken (JP); Hideyuki Usui, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/945,765

(22) Filed: Sep. 4, 2001

(65) Prior Publication Data

US 2002/0034113 A1 Mar. 21, 2002

(30) Foreign Application Priority Data

Sep. 19, 2000 (JP) ........................................ 2000-283211

(51) Int. Cl.[7] .............................. G06K 7/08; H01Q 1/24; H01Q 1/12
(52) U.S. Cl. ........................ 235/451; 343/702; 343/877
(58) Field of Search ................................ 343/702, 877; 235/451; 381/600, 671, 657; 439/55, 131; 395/800

(56) References Cited

U.S. PATENT DOCUMENTS

| | | | | |
|---|---|---|---|---|
| 5,440,449 A | * | 8/1995 | Scheer | 361/686 |
| 5,509,811 A | * | 4/1996 | Homic | 439/55 |
| 5,590,346 A | * | 12/1996 | West et al. | 455/348 |
| 5,608,606 A | * | 3/1997 | Blaney | 361/686 |
| 5,628,055 A | * | 5/1997 | Stein | 455/575 |
| 5,644,320 A | * | 7/1997 | Rossi | 343/702 |
| 5,684,672 A | * | 11/1997 | Karidis et al. | 361/683 |
| 5,769,643 A | * | 6/1998 | Stevens, III | 434/350 |
| 5,779,496 A | * | 7/1998 | Bolinger et al. | 439/377 |
| 5,887,145 A | * | 3/1999 | Harari et al. | 710/301 |
| 5,913,174 A | * | 6/1999 | Casarez et al. | 455/557 |
| 5,943,018 A | * | 8/1999 | Miller | 343/702 |
| 6,087,994 A | * | 7/2000 | Lechter | 343/702 |
| 6,099,329 A | * | 8/2000 | Goff et al. | 439/131 |
| 6,222,501 B1 | * | 4/2001 | Yajima et al. | 343/878 |
| 6,273,735 B1 | * | 8/2001 | Johnson et al. | 439/131 |
| 6,344,825 B1 | * | 2/2002 | Wong | 343/702 |
| 6,381,662 B1 | * | 4/2002 | Harari et al. | 710/301 |
| 6,419,506 B2 | * | 7/2002 | Jones et al. | 439/131 |
| 6,429,817 B1 | * | 8/2002 | Creigh et al. | 343/702 |
| 6,469,669 B1 | * | 10/2002 | Tran | 343/702 |
| 6,539,207 B1 | * | 3/2003 | del Castillo et al. | 455/90.3 |

FOREIGN PATENT DOCUMENTS

JP          2001344043 A1 * 12/2001

* cited by examiner

*Primary Examiner*—Karl D. Frech
*Assistant Examiner*—Daniel Walsh
(74) *Attorney, Agent, or Firm*—Ohlandt, Greeley, Ruggiero & Perle, L.L.P.; Daniel P. Morris

(57) ABSTRACT

To provide connecting means between an antenna structure, which is in a PC main body, and a PC card that does not have an extruding section.

There are included a housing 8, an antenna structure, a slot 10 of the housing into which a PC card is inserted, a high frequency cable 5 one end of which is connected to the antenna structure electrically and part of which is pulled outside the housing, a connector plug 6 that is connected to the other end of the high frequency cable 5 electrically and is outside the housing, and an elastic body such as rubber 13 which is configured so that the high frequency cable is pulled inside the housing.

11 Claims, 10 Drawing Sheets

[Figure 1]
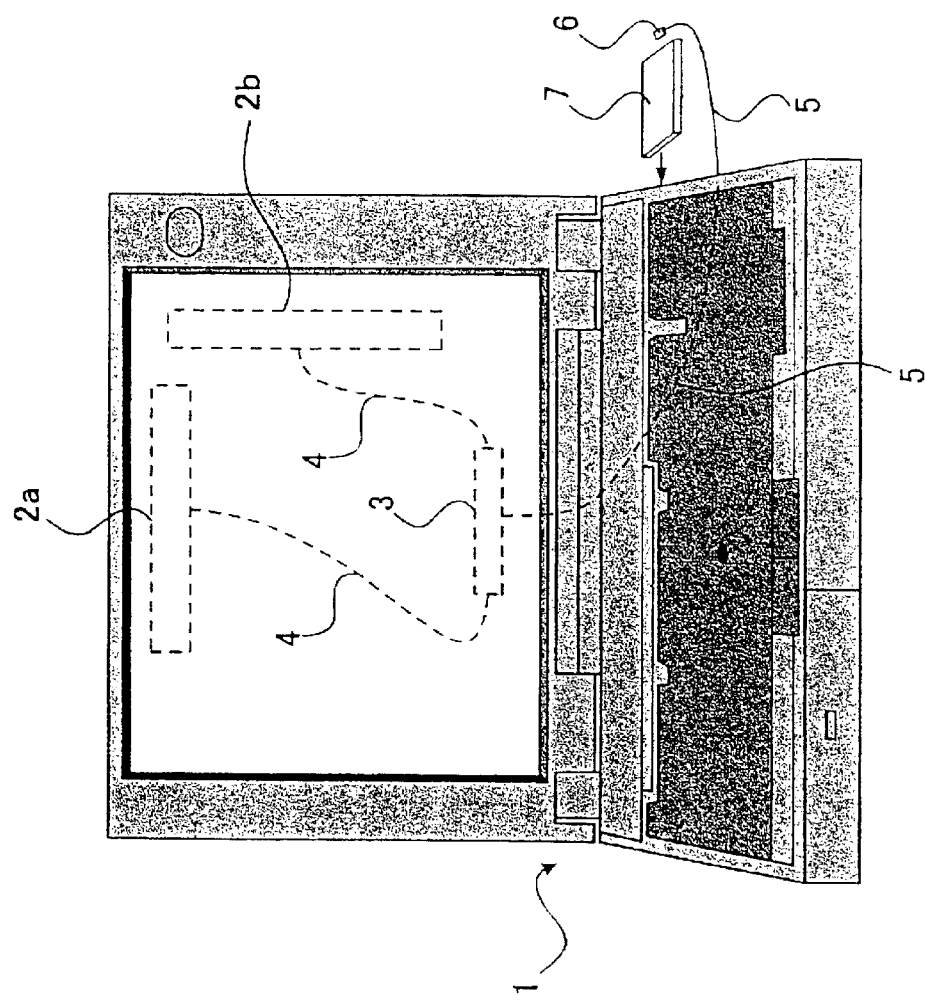

[Figure 2]
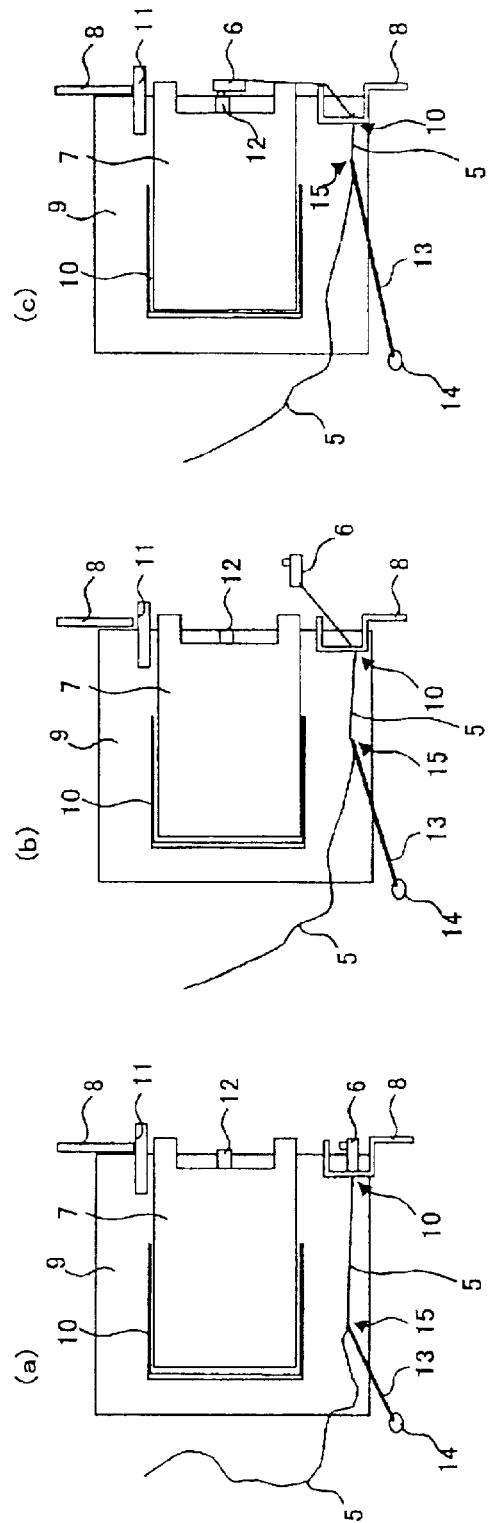

[Figure 3]
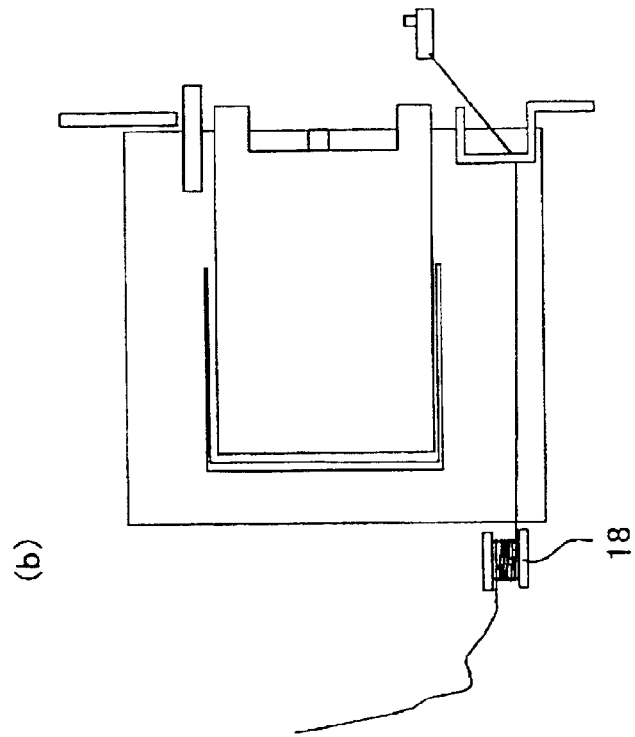
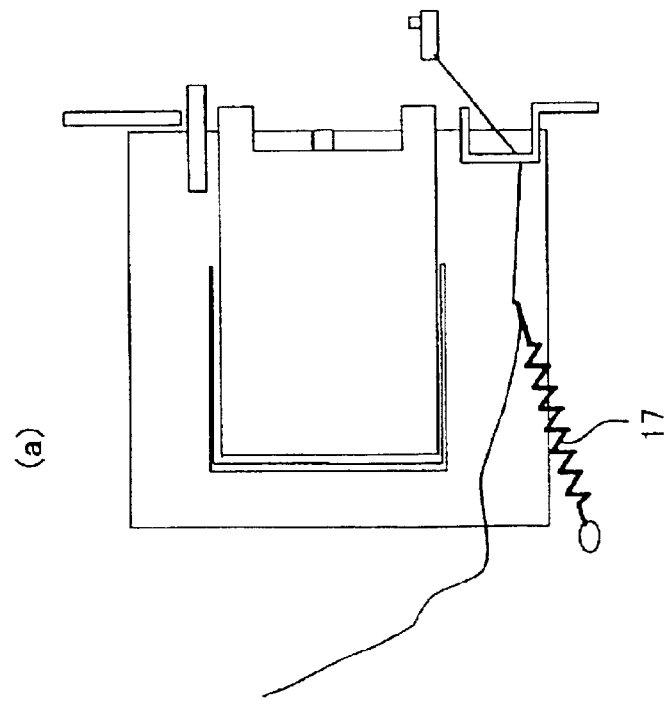

[Figure 4]
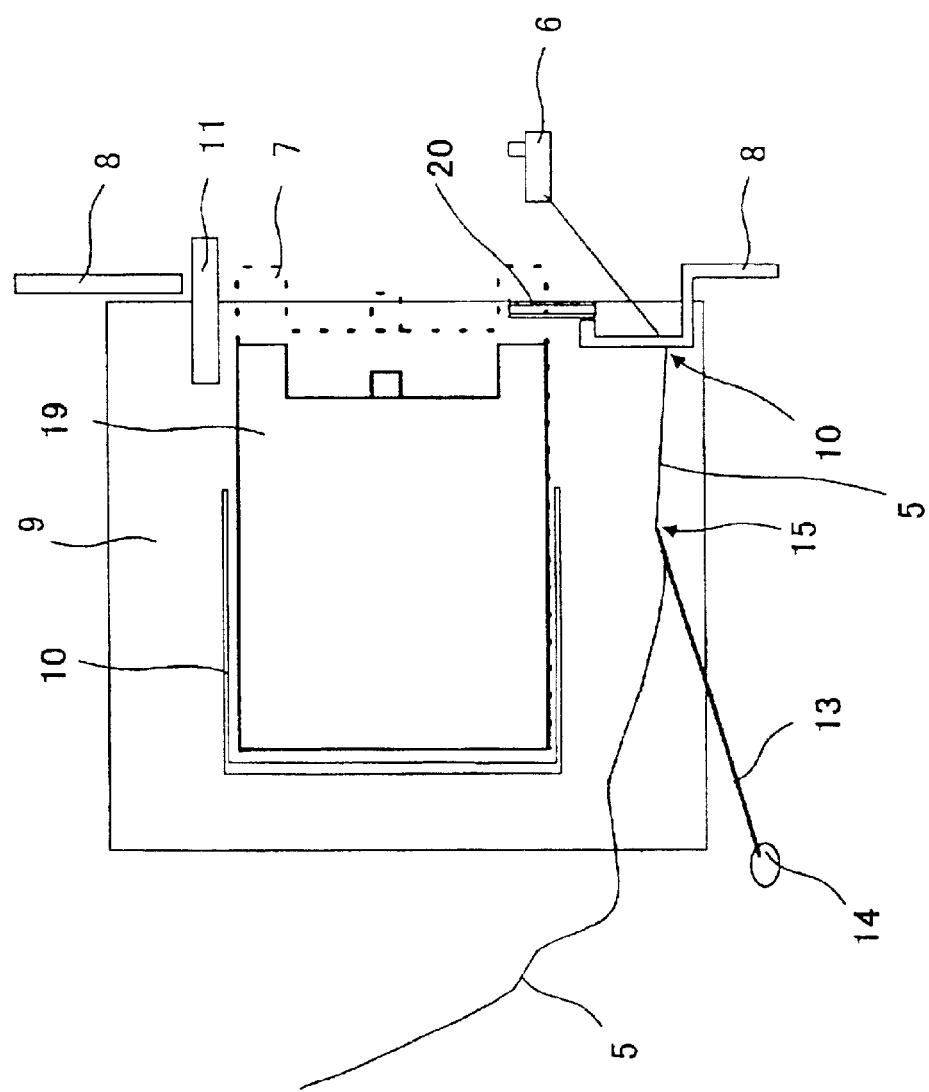

[Figure 5]
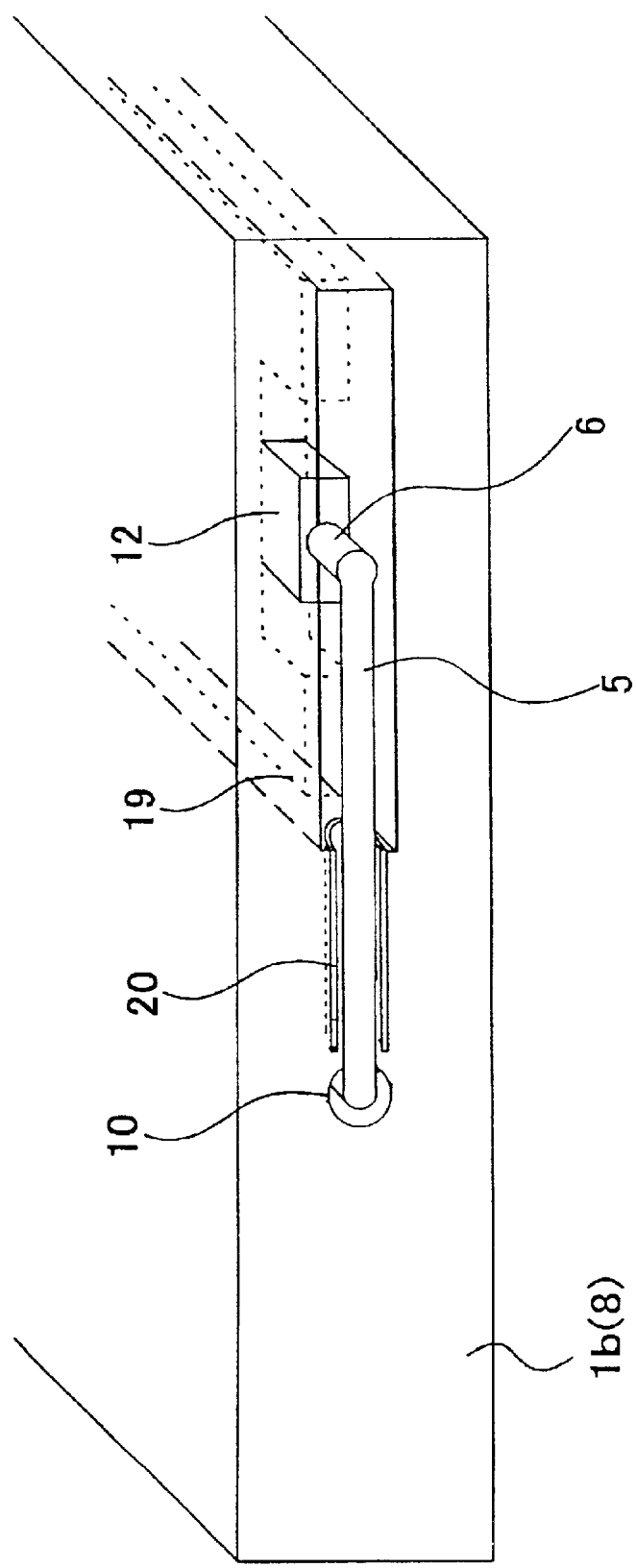

[Figure 6]
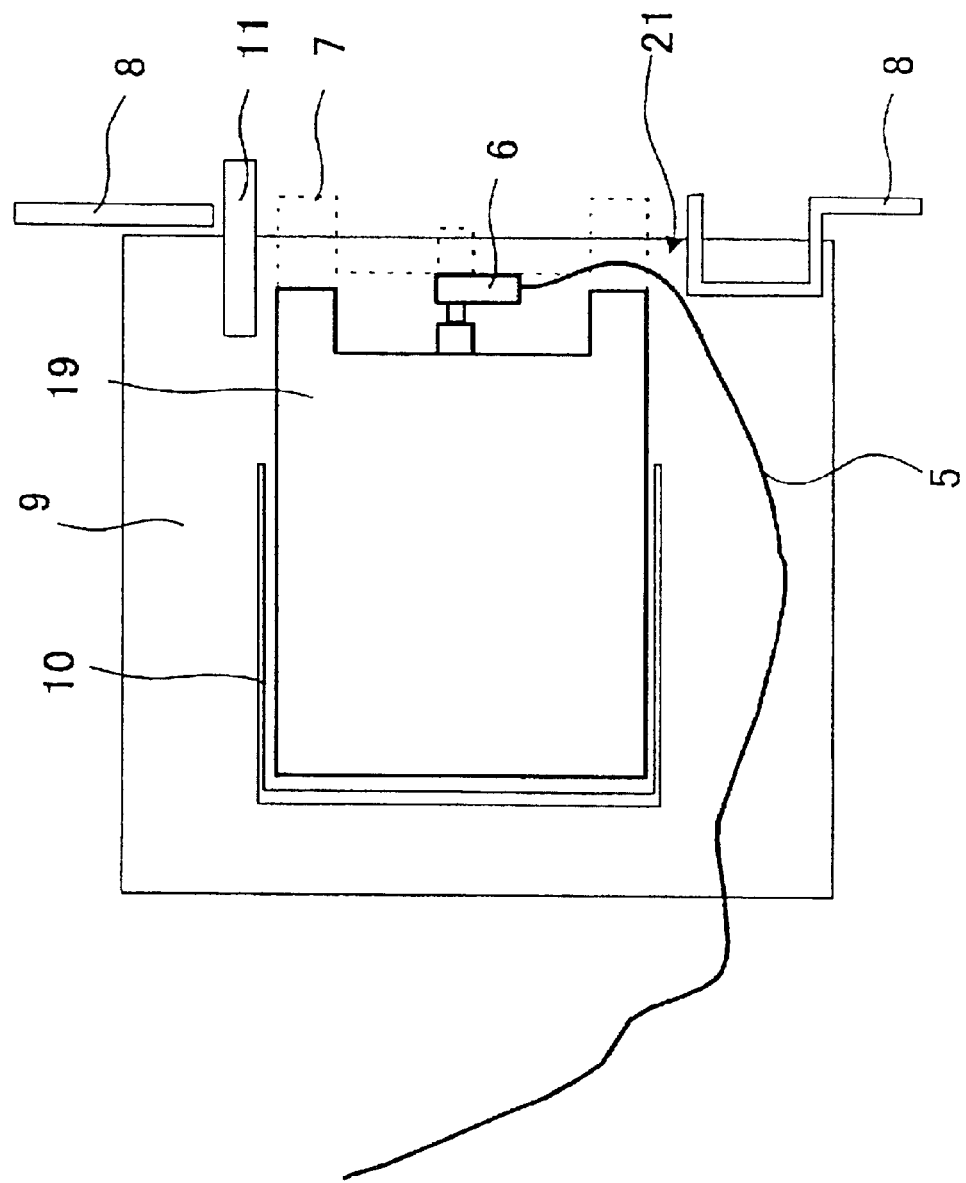

[Figure 7]
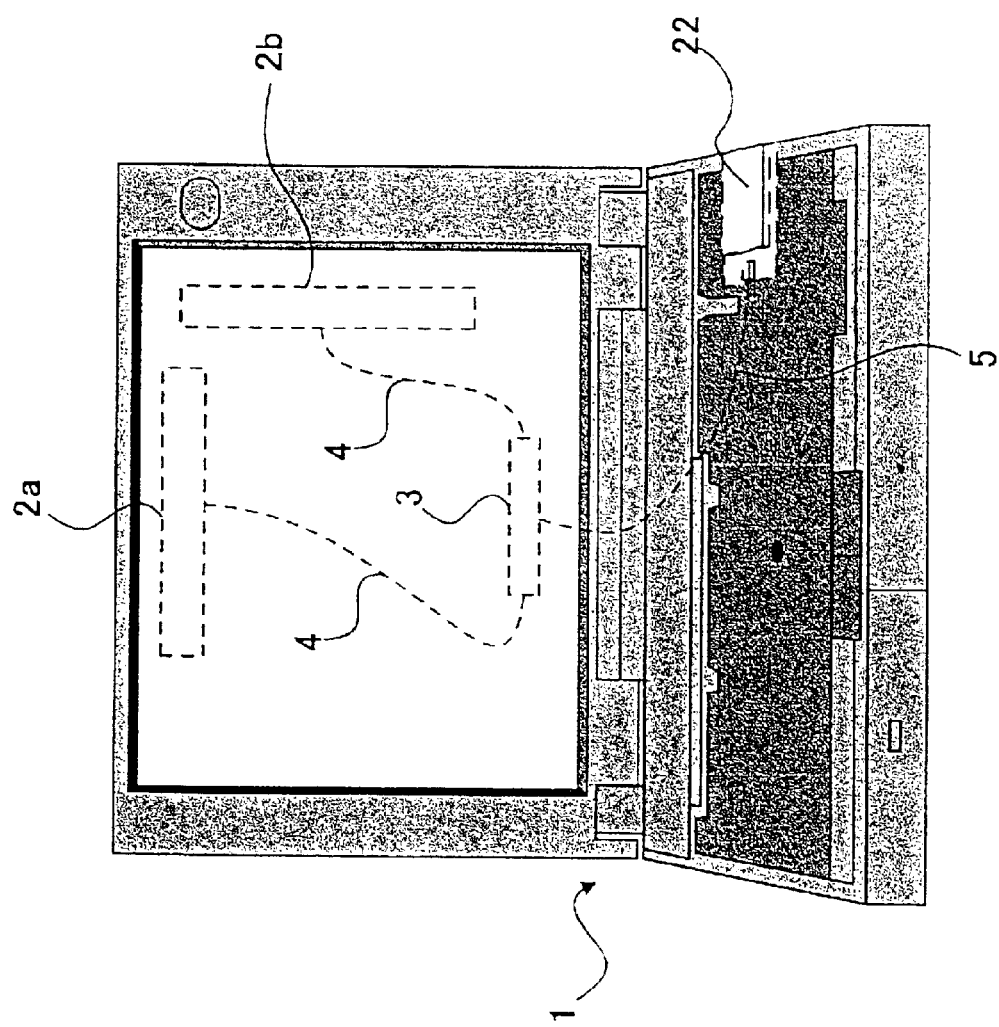

[Figure 8]
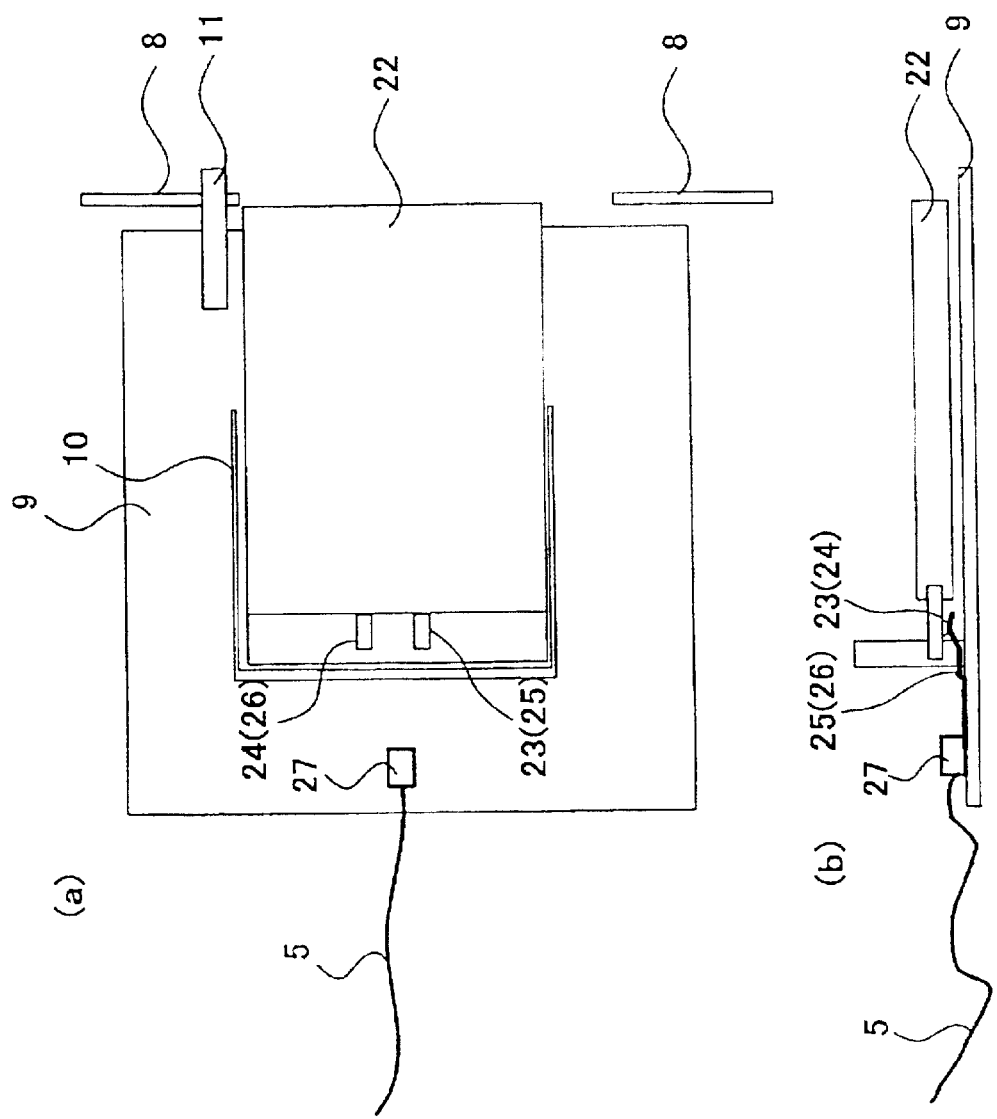

[Figure 9]
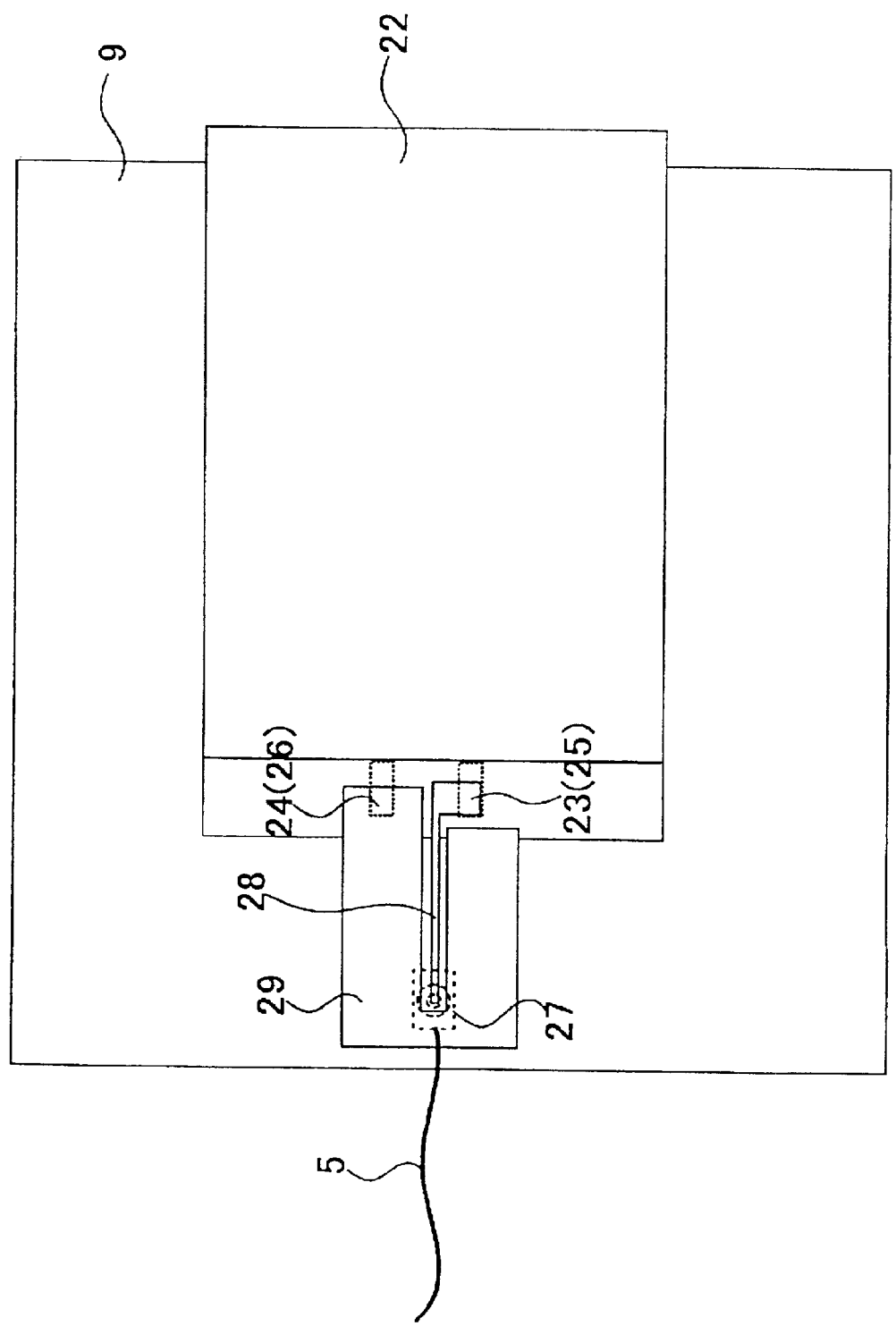

[Figure 10]
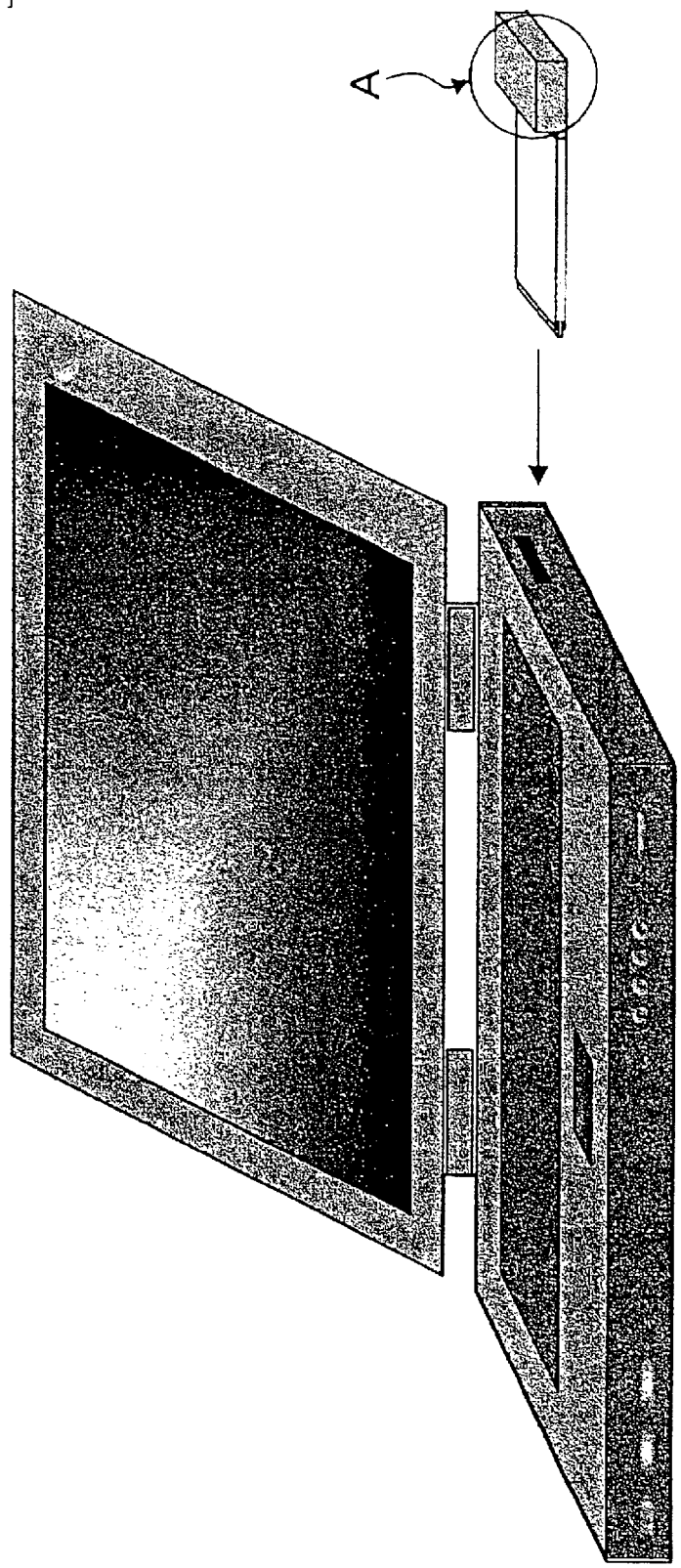

CONNECTING STRUCTURE OF CARD, CARD, AND COMPUTER SYSTEM

DETAILED DESCRIPTION OF THE INVENTION

1. Field of the Invention

The present inventions relates to a computer system, a PC card, and connecting structure between a PC card and a computer system, and in particular, to technology that is effectively applied to connecting structure between a PC card for wireless LAN and a computer system.

2. Background Art

Recently, means for connecting to a telephone network or a communication network such as a LAN (Local Area Network) becomes indispensable for a PC (personal computer) user owing to the wide spread of utilization of the Internet or utilization of an office intranet. Owing to this, devices to connect a PC to a communication network, such as a modem and a LAN adapter become indispensable to a computer system.

There is a PCMCIA (Personal Computer Memory Card International Association) card as effective means for providing these communication devices as a CTO (Configure To Order) in response to a user's specification order or BTO (Build To Order) for a standard product. The PCMCIA card is a PC card standardized by PCMCIA (card type peripheral device for a PC), and includes memory, a hard disk drive, a modem, a LAN interface, and the like, or, for example, a SCSI (Small Computer System Interface) function for interfacing to other peripheral devices such as a CD-ROM drive, and a DVD-ROM drive.

There are five types of standards in the PCMCIA cards, that is, Type I, Type II, Type III, Type I extended, and Type II extended. All of Types I to III PCMCIA cards commonly have dimensions of 54.0 mm wide and 85.6 mm deep, and have thickness different from each other. The thickness of Types I, II, and III cards is 3.3 mm, 5.0 mm, and 10.5 mm or less respectively. The Type I card is used as a memory card mainly, and the Type II card is used for a modem, a LAN (Ethernet) adapter, a SCSI adapter, or the like. The Type III card is adopted as a built-in hard disk card mainly.

The Type I extended card and Type II extended card are extended cards in length that are longer than the Type I card and Type II card respectively. In an extruding section, a receptacle of a modular jack is provided, or an antenna for a wireless LAN is housed.

Problems to be Solved by the Invention

Although it is possible to connect a PC to a communication network by these PCMCIA cards, for example, if a PCMCIA card is a modem or a wired LAN, its cable management becomes a problem. If used as a modem card, the extruding section of the Type I extended or Type II extended card is used as a receptacle of a modular jack. In the case of the Type II card that does not have the extruding section, a conversion cable named as a dangle is used.

In the case of a desk-top computer system, it is approved to some extent, but when a computer system is used in a mobile environment like a notebook PC, complexity of cabling, and necessity of bringing the conversion cable obstruct user's convenience.

Then, it is expected to utilize a wireless LAN that does not cause the problem of the cable management. When the wireless LAN is going to be provided in a PCMCIA card, usually, it is not supposed that an antenna structure is supplied from a PC body. Hence a standard on a Type I extended or a Type II extended is used, and an antenna function is implemented in its extruding section.

Nevertheless, when the Type I extended card or Type II extended card is inserted into a PC body, as shown in FIG. 10, the extruding section A protrudes from the PC main body. With considering mobile use, the extruding section inconveniently becomes an obstacle for containing the PC in an attached case, and the extruding section may hit something to be failed. Therefore, it is preferable that the antenna structure is integrated in the PC body. Nevertheless, presently, there is not connecting means of the antenna structure inside the PC to the PCMCIA card not having the extruding section.

An object of the present invention is to provide the connecting means of the antenna structure, which is, in a PC body, to the PCMCIA card (PC card) that does not have the extruding section.

In addition, another object of the present invention is to provide means in which a cable does not become obstructive if the cable is used in this means, and which gives good impression to a user by making the appearance of the connecting means neat.

SUMMARY OF THE INVENTION

Hereinafter, the summary of the present invention will be explained. Thus, a computer system of the present invention comprises a housing, an antenna structure, a slot of the housing into which a PC card is inserted, a high frequency cable one end of which is connected to the antenna structure electrically and part of which is pulled outside the housing, a connector plug that is connected to the other end of the high frequency cable electrically and is outside the housing, and an elastic body or a cord take-up mechanism that is configured so that the high frequency cable is pulled inside the housing.

According to such a computer system, because the computer main body includes the antenna mechanism, it is not necessary to have the antenna structure in the PC card (PCMCIA card). Owing to this, it becomes possible to omit the extruding section because it is possible to use any one of Types I to III as the standard of the PC card. In addition, in a computer system of the present invention, a high frequency cable is used as connecting means of a PC card to an antenna structure of a PC body, and the computer system is configured so that this high frequency cable is always pulled into the PC body by an elastic body or a take-up mechanism. Owing to this, since an unnecessary high frequency cable is not pulled outside the PC body (housing), it is possible to make the appearance of the computer system neat. In addition, it is possible to avoid a contingency such as hitching of the cord, unnecessarily pulled out, during mobile use. Here, it is possible to exemplify rubber or a spring as the elastic body. It is possible to exemplify a coiled spring as the spring.

Furthermore, it is possible to form a channel, in which a cable is loaded, between a cable inlet in the housing of the computer and the PC card. By loading the cable in such a channel, it is possible not only to neatly treat the cable outside the housing and to make the appearance of the computer neat, but also to decrease a probability of an accident caused by the hitching of the cable.

In addition, it is possible to configure a PC card in length so that a connector plug does not protrude from a face of the housing in a status that the PC card is inserted in a slot and the connector plug is connected to a receptacle. At this time, it is possible to make the length of the PC card, which is in a direction of the PC card being inserted into the slot, be in a range of 75–80 mm. In this manner, it is possible not only to improve visual impression by getting rid of protrusion from an edge surface of the housing including the length of a connector, but also to decrease probabilities of accidents of hitching of the connector and the like.

Moreover, a computer system of the present invention comprises an antenna structure, a slot of the computer system into which a PC card is inserted, and a spring terminal connected to the antenna structure electrically, wherein the computer system is configured so that the spring terminal contacts to the outside of a housing of the PC card by the PC card being inserted into the slot. According to such a computer system, similarly as described above, it is possible to get rid of an extruding section of the PC card because it is not necessary to have the antenna structure in the PC card. In addition, since the connection of the PC card to the antenna structure is realized by the spring terminal, it is not necessary to pull the high infrequency cable outside the housing of a main body of the computer system, and it is possible to make its appearance neat, and to get rid of troubles of hitching, caused by the high frequency cable, and the like.

Furthermore, the PC card has a pad terminal connected to a high frequency module in the outside of the housing of the PC card, and hence it is possible to configure the computer system so that a spring terminal contacts to the pad terminal by the PC card being inserted into the slot. Owing to this, connection of the spring terminal with the card can be performed by the single operation of the card being inserted in the slot, and hence it is possible to simplify card handling.

Moreover, it is possible to configure the computer system so that the computer system comprises a coaxial high frequency cable one end of which is connected to an antenna structure and the other end of which is connected to a printed circuit board, wherein a wiring pattern on the printed-circuit board to connect the high frequency cable to a spring terminal has a first pattern connected to a central conductor of the high frequency cable and a second pattern that surrounds the first pattern and is connected to a peripheral conductor of the high frequency cable. By improving electric shielding property between the PC card and coaxial cable through surrounding the first pattern, which is a signal bus, with the second pattern that is maintained in ground potential, it is possible to suppress the leakage of radio waves in the printed-circuit board.

In addition, the above-described structure is remarkably effective when being applied to a notebook type computer system.

PREFERRED EMBODIMENTS

Hereinafter, embodiments of the present invention will be described with reference to drawings. Nevertheless, the present invention can be implemented in a lot of different aspects, and hence the present invention should not be interpreted with limiting to description contents of these embodiments. In addition, the same reference numeral will be assigned to the same element over the embodiments.

Embodiment 1

FIG. 1 is a schematic diagram showing an example of a computer system of the present invention. The computer system in this embodiment is a notebook type computer system. A computer system 1 consists of a lid section 1*a* housing a liquid crystal display device, a peripheral circuit thereof, a back light, and the like, and a main body section 1*b* housing a motherboard, a keyboard, a hard disk drive, a CD-ROM drive, a floppy disk drive and the like.

Housings of the lid section 1*a* and main body section 1*b* are made of, for example, ABS resins. Inside the lid section 1*a*, for example, between a housing and a backlight, antennas 2*a* and 2*b* are located. The antennas 2*a* and 2*b* are, for example, aperture antennas made of a copper ground plane having rectangular apertures. The antennas 2*a* and 2*b* are located in a vertical direction and a horizontal direction respectively in order to cope with a vertically polarized wave and a horizontally polarized wave. A switcher 3 selects one of these antennas 2*a* and 2*b* according to the intensity of a reception radio signal. A coaxial high-frequency cable 4 connects the antennas 2*a* and 2*b* to the switcher 3. In addition, here, aperture antennas are exemplified, but the present invention is not limited to these. Another type of antenna, for example, a dipole antenna or a fold antenna can be adopted. In addition, it is not necessary to locate two antennas. Although a configuration example having the switcher 3 is explained, the switcher 3 is not a component indispensable for the present invention. Furthermore, locations of antennas are arbitrary. The antennas can be also located in a side face of the lid section 1*a*, or can be also located in a side face of the main body section 1*b* or in a bottom face.

A signal selected by the switcher 3 is transmitted by the coaxial high frequency cable 5. The high frequency cable 5 is introduced into the main body section 1*b*, and is led to the outside of the housing in a side face of the main body section 1*b*. Inside the housing of the main body section 1*b*, there is a mechanism pulling the high frequency cable 5 into the housing. This mechanism will be explained later. The high frequency cable 5 is configured in standardized size and with standardized material. It is preferable that the high frequency cable 5 is as thin as possible, but its thickness is arbitrary. The characteristic impedance of the high frequency cable 5 is, for example, 50Ω or 75Ω. In addition, in FIG. 1, the high frequency cable 5 is drawn as the high frequency cable 5 passes each midsection of the lid section 1*a* and main body part 1*b*, but its passageway is arbitrary. For example, the high frequency cable 5 can also pass a hinge portion of both ends of the lid section 1*a* and main body part 1*b*.

A connector plug 6 is attached in an end portion of the high frequency cable 5 that is led to the outside of the housing. The connector plug 6 is configured so that the connector plug 6 is connected to a receptacle that is attached in a side face section of a PC card 7. The PC card 7 is inserted into a slot provided in a side face of the housing of the main body section 1*b*.

FIGS. 2A to 2C are top views showing a PC card insertion section in detail. A substrate 9 exists inside the housing 8 of the main body section 1*b*, and the slot 10 is provided in the substrate 9. The PC card 7 is inserted along the slot 10, and is taken out by an eject knob 11. A receptacle 12 is provided outside the housing of the PC card 7, and the connector plug 6 is connected to the receptacle 12.

FIG. 2A is a drawing showing a status that the connector plug 6 is detached from the receptacle 12. The high frequency cable 5 connected to the connector plug 6 is pulled into the housing 8 by an elastic body such as rubber 13. One end of the rubber 13 is fixed to a terminator 14 fixed in the housing, and the other end thereof is fixed to an intermediate portion of the high frequency cable 5. A relative position between a fixing section 15 and the terminator 14, as shown in the figure, is located so that the high frequency cable 5 is pulled into the inside of the housing 8. Thus, the connector plug 6 is stopped in an opening section 16 from which the high frequency cable 5 is led to the outside of the housing 8, and tension to some extent is always applied to the high frequency cable 5 between the fixing section 15 and connector plug 6.

FIG. 2B is a top view showing a status that the connector plug 6 is pulled out in the outside. According to the increase of the tension of the high frequency cable 5 between the fixing section 15 and connector plug 6, the rubber 13 is extended.

FIG. 2C shows a status that the connector plug 6 is further pulled and is inserted into the receptacle 12. In this status, the high frequency cable 5 being outside the housing 8 receives tension so that the high frequency cable 5 is always pulled into the housing 8 by the rubber 13. Hence, the high frequency cable 5 exposed outside the housing 8 becomes the shortest. Since an unnecessary portion of the high frequency cable 5 is pulled into the housing, it is possible to decrease accidents of hitching of the high frequency cable 5 and the like. In addition, it is possible to make its appearance neat. Furthermore, because the connector plug 6 is stably exists in the vicinity of the opening 16 of the housing 8 even in a status that the connector plug 6 is detached from the receptacle 12 (status in FIG. 2A), the high frequency cable 5 and connector plug 6 do not become obstructive. Moreover, it is not necessary to bring a dangle as a conversion cable in this embodiment, and hence there is no worry about missing of the dangle. Thus, it becomes easy to perform cable management.

In addition, although, in above-described description, the rubber 13 is exemplified as the elastic body, as shown in FIG. 3A, a spring 17 can be also used instead of the rubber 13. FIG. 3A is a top view showing another example of the PC card insertion section. A coiled spring can be exemplified as the spring 17. Furthermore, in the above description, the elastic bodies (rubber 13 and spring 17) each are exemplified as a mechanism pulling the high frequency cable 5 into housing, but, as shown in FIG. 3B, it can be also performed to provide a cable take-up mechanism 18. FIG. 3B is a top view showing a further example of the PC card insertion section. It is possible to configure the cable take-up mechanism 18 so that constant tension is always applied to the high frequency cable 5 and it is possible to bring effects similar to those described above. If the cable take-up mechanism 18 is applied, structure becomes complicated to some extent, but this has a merit that material characteristics such as elastic modulus hardly deteriorate with age like spring or rubber. In addition, FIGS. 3A and 3B show each status that the connector plug 6 is pulled out.

In addition, as shown in FIG. 4, the length of the PC card in a direction of the PC card being inserted can be shortened. If the length of the PC card is the length in the standard (85.6 mm), a problem that part of the connector plug 6 protrudes outside the housing may arise. If the PC card including the connector plug 6 can be installed inside the housing 8, for example, treatment of closing the opening of a slot section and the like can be performed. Owing to this, it is possible to enhance visual treatment, and also to protect a connector.

FIG. 4 is a top view showing a still further example of the PC card insertion section. The PC card 7 shown by a dotted line is a PC card whose length in a direction of the PC card being inserted is 85.6 mm, and FIG. 4 shows a status that this is inserted into the slot 10. An edge face of the PC card 7 is almost flush with a side face of the housing 8. If the connector plug 6 is connected to the receptacle 12 in this status, part of the connector plug 6 protrudes from a side face of the housing 8.

Then, a PC card 19 whose length in the insertion direction is a little short is configured, and this PC card 19 is inserted into the slot 10. The length of the PC card 19 in the inserting direction is, for example, 75–80 mm. By making the PC card be in such length, it is possible to get rid of a protrusion protruding from the housing 8 even if the length of the connector plug 6 is included.

Furthermore, as shown in FIG. 4, it is possible to form a channel 20, where the high frequency cable 5 is loaded, in a side face of the housing 8. FIG. 5 is a perspective view showing a status that the connector plug 6 is inserted into the receptacle 12 and the high frequency cable 5 is loaded in the channel 20. By forming the channel 20 like this, it is possible to thoroughly get rid of the protrusion from the side face of the main body section 1b (housing 8). Owing to this, it is possible to make its appearance neat, and to protect a connector and a high frequency cable. It can be also performed to make its appearance neat and to protect a connector and the like, by providing an open/close type lid in a side face section. In addition, illustration of the lid section 1a is omitted in FIG. 5.

In addition, if the PC card 19 whose length in the insertion direction is short is used, as shown in FIG. 6, cabling can be performed by taking out the high frequency cable 5 and connector plug 6 from a clearance 21 formed by the PC card 19 becoming short without providing an elastic body or a pulling mechanism by cable winding.

Embodiment 2

FIG. 7 is a conceptual diagram showing an example of a computer system according to another embodiment of the present invention. A high frequency cable system of this embodiment, similarly to a computer system of the first embodiment, comprises a lid section and a main body section, which have similar antennas 2a and 2b, the switcher 3, and high frequency cables 4 and 5. However, in the computer system of this embodiment, a PC card 22 that is connected to the antennas inside a slot is used. Owing to this, the high frequency cable 5 is not pulled out outside the housing.

FIGS. 8A and 8B are a top view (FIG. 8A) and a side view (FIG. 8B) that each show a slot section, where a PC card of this embodiment is inserted, in detail. Inside the housing 8, similarly to the first embodiment, the substrate 9 and slot 10 are provided.

A connector portion based on the standard for PC cards is configured with standard 68-pin connector in conformance with the PCMCIA standard. However, in this embodiment, terminals 23 and 24 each having a pad shape are provided under a connector of the PC card 22. In order to make contact good, it can be also performed to provide a protrusion on each pad.

The pad terminals 23 and 24 are connected to a high frequency module in the PC card respectively. One terminal (for example, terminal 23) is connected to a high frequency signal terminal, and another terminal (for example, terminal 24) is connected to the ground. Furthermore, since the pad terminals 23 and 24 are mechanically rubbed with spring terminals described later, it is preferable to have mechanical strength to some extent. For example, it is possible to exemplify pads composed of gold- or solder-plated copper patterns formed on a printed-circuit board. In this case, the pad terminals are formed as copper patterns.

In this embodiment, spring terminals 25 and 26 are provided on the substrate 9 so that the PC card 22 contacts to the pad terminals 23 and 24 when the PC card 22 is inserted. The spring terminal 25 is connected to the pad terminal 23 and the spring terminal 26 is to the pad terminal 24. The spring terminals 25 and 26 are put underneath by the inserting operation of the PC card 22 into the slot 10 (sliding in an insertion direction), and are pushed up from a bottom face of the PC card 22 by the elasticity of the springs to keep contact with the pad terminals 23 and 24. It is apparent to form the spring terminals 25 and 26 with electric conductors, and it is preferable to form them with metal and the like, having adequate elastic modulus.

The spring terminals 25 and 26 are connected to a central conductor and a peripheral conductor of a connector 27 respectively to be connected to the high frequency cable 5 that is coaxial.

According to the computer system and connecting structure of a PC card according to this embodiment, the high frequency cable 5 is never pulled out outside the housing 8 of the computer. Owing to this, appearance is neat, and the occurrence of a failure caused by the cable can be prevented. In addition, in this embodiment, since high frequency connection is performed simultaneously by the inserting operation of the PC card 22, it is possible to make easy-to-use and simple configuration.

In addition, if a card except a PC card for wireless communication is inserted in the card slot 10 according to this embodiment, the spring terminals 25 and 26 contact to a housing of this card. Nevertheless, since the antenna 2 is a passive element and line voltage is never applied, a malfunction caused by the contact of the spring terminals never arises.

Furthermore, although it is possible to use, for example, a printed-circuit board (substrate 9) for connection of the spring terminals 25 and 26 to the connector 27, as shown in FIG. 9, it is possible to form a ground plane pattern 29 as surrounding a signal bus 28. In this manner; by surrounding the signal bus 28 with the ground plane pattern 29, it is possible to prevent the leak of the signal to the printed-circuit board, and to expect an effect of reducing noise.

Thereinbefore, although the invention, which is made by the present inventor, is concretely described on the basis of embodiments of the invention, the present invention is not limited to the above-described embodiments, but various kinds of modification can be formed within a scope of the gist of the present invention.

For example, in each of the above-described embodiments, a notebook type personal computer is exemplified as a computer system, but the present invention can be also applied to a desktop personal computer or a tower type personal computer. In addition, a computer is not limited to a personal computer, but the present invention can be applied to a workstation, too. Furthermore, if a PC card slot is also provided in a PDA (Personal Digital Assistants), the present invention can be applied.

Moreover, although a PCMCIA card is typically exemplified as a PC card, the present invention can be also applied to other cards, and cards that will be standardized in future.

In addition, although a radio frequency in a 2.4 GHz band is taken into consideration mainly in a card for wireless interface to which the present invention is applied, the present invention is not limited to the radio frequency. For example, the present invention can be applied to a television radio signal in a 100 MHz band, a radio signal for a cellular phone in a 900 MHz band or a 1.5 GHz band, and wireless communication at frequencies in 5 GHz and higher bands.

Advantages of the Invention

Advantages to be provided by representative inventions among inventions disclosed in the present application are as follows. Thus, the present inventions can provide connecting means of an antenna structure, being in a PC body, to a PC card not having an extruding section. In addition, the cable does not become obstructive if the cable is used in this means, and this means can give good impression to a user by making the appearance of the connecting means neat.

BRIEF DESCRIPTION OF THE DRAWINGS

FIG. 1 is a schematic diagram showing an example of a computer system of the present invention;

FIGS. 2A to 2C are top views each showing details of a PC card insertion section, FIG. 2A is a top view showing a status that a connector plug is detached from a receptacle, FIG. 2B is a top view showing a status that the connector plug is pulled out to the external, and FIG. 2C is a top view showing a status that the connector plug is connected to the receptacle;

FIG. 3A is a top view showing another example of the PC card insertion section, and FIG. 3B is a top view showing still another example of the PC card insertion section;

FIG. 4 is a top view showing a further example of a PC card insertion section;

FIG. 5 is a perspective view showing a status that a connector plug is inserted into a receptacle and a high frequency cable is loaded in a channel;

FIG. 6 is a top view showing a still further example of the PC card insertion section;

FIG. 7 is a conceptual view showing an example of a computer system according to another embodiment of the present invention;

FIGS. 8A and 8B are detailed view each showing a slot section where a PC card which is an embodiment of the present invention is inserted, FIG. 8A is a top view, and FIG. 8B is a side view;

FIG. 9 is a top view showing a PC card insertion section; and

FIG. 10 is a conceptual view to explain a subject of the present invention.

DESCRIPTION OF SYMBOLS

1 . . . computer system
1a . . . lid section
1b . . . main body section
2, 2a, 2b . . . antennas
3 . . . switcher
4, 5 . . . high frequency cable
6 . . . connector plug
7 . . . PC card
8 . . . housing
9 . . . substrate
10 . . . slot (card slot)
11 . . . eject knob
12 . . . receptacle
13 . . . rubber
14 . . . terminator
15 . . . fixing section
16 . . . opening section
17 . . . spring 18 . . . cable take-up mechanism
18 . . . PC card
19 . . . channel
20 . . . clearance
21 . . . PC card
23, 24 . . . pad terminals
25, 26 . . . spring terminals
27 . . . connector
28 . . . signal bus
29 . . . ground plane pattern
A . . . extruding section.

What is claimed is:

1. A computer system comprising:
   a housing;
   an antenna structure;
   a slot of the housing into which a PC card is inserted;
   a high frequency cable one end of which is connected to the antenna structure electrically and part of which is pulled out outside the housing;
   a connector plug that is connected to the other end of the high frequency cable electrically and is outside the housing; and
   an elastic body or a cord take-up mechanism that is configured so as to pull the high frequency cable in the housing.

2. The computer system according to claim 1, wherein the elastic body or the cord-take up mechanism comprises a rubber or a spring.

3. The computer system according to any one of claims 1 and 2, wherein the PC card has a receptacle facing the outside of the housing in a status that the PC card is inserted into the slot, the connector plug is connected to the receptacle, and the high frequency cable that is exposed outside the housing is pulled into the housing by the elastic body or the cord take-up mechanism.

4. The computer system according to claim 3, having a channel where the cable is loaded between a cable inlet and the slot, where the PC card is inserted, in the housing.

5. The computer system according to claim 3, wherein the PC card is configured such length that the connector plug does not protrude from a face of the housing in a status that the PC card is inserted into the slot and the connector plug is connected to the receptacle.

6. The computer system according to claim 5, wherein length of the PC card in a direction of the PC card being inserted is in a range of 75–80 mm.

7. Connecting structure between a PC card and a computer system comprising:
   a high frequency cable that is pulled in or pulled out from an opening section provided in the vicinity of a PC card slot of the computer system and one end of which is connected to an antenna structure electrically; and
   a connector plug that is connected to the other end of the high frequency cable electrically, and is outside a housing of the computer system to be connected to a receptacle of the PC card inserted in the PC card slot, wherein the connecting structure is configured so that the high frequency cable is pulled into the housing by an elastic body or a cord take-up mechanism.

8. The connecting structure according to claim 7, wherein the elastic body is rubber or a spring.

9. A PC card that is inserted in a slot of a computer system and has a receptacle, to which a connector plug of a high frequency cable is connected, wherein the receptacle is mounted on one end surface of the PC card without overlying a top surface thereof, and wherein the PC card is configured in such a length that the connector plug does not protrude from a face of the housing of the computer system in a status that the PC card is inserted into the slot and the connector plug is connected to the receptacle.

10. The PC card according to claim 9, wherein length of the PC card in a direction of the PC card being inserted is in a range of 75–80 mm.

11. A computer system comprising: a housing; an antenna structure; a slot of the housing where a card is inserted; a cable one end of which is connected to the antenna structure electrically and part of which is pulled out from the housing; connector plug that is connected to the other end of the cable electrically and is outside the housing; and an elastic body or a cord take-up mechanism that is configured so as to pull the cable into the housing.

* * * * *